United States Patent Office 3,105,857
Patented Oct. 1, 1963

3,105,857
METHOD FOR THE PRODUCTION OF ISOPRENE
Guenter R. Ackermann, Broomall, Pa., assignor to The Atlantic Refining Company, Philadelphia, Pa., a corporation of Pennsylvania
No Drawing. Filed Mar. 29, 1961, Ser. No. 99,062
4 Claims. (Cl. 260—681)

This invention relates to a method for the production of isoprene and, more particularly, to a process for the production of isoprene by the methanolysis of 4,4-dimethyl-meta-dioxane.

The production of meta-dioxanes by reacting an oleofinic hydrocarbon with an aldehyde in the presence of an aqueous sulfuric acid catalyst is well known as the so-called Prins reaction. For example, if isobutylene is the olefin and formaldehyde the aldehyde, at room temperature in the presence of 25 percent aqueous sulfuric acid, there will be produced 4,4-dimethyl-meta-dioxane. The details of the Prins reaction and the production of meta-dioxanes have been described in great detail in patents and the technical literature, an excellent review of which has been made by E. Arundale and L. A. Mikeska, and published in Chemical Reviews, vol. 51, No. 3, pp. 505–555 (December 1952), under the title "The Olefin-Aldehyde Condensation, the Prins Reaction."

It is also known that the meta-dioxanes can be hydrolyzed by treatment with dilute acids at elevated temperatures to form 1,3-butanediols and that if methanol and a meta-dioxane such as 4-methyl-meta-dioxane are heated together in the presence of concentrated sulfuric acid, methylal will be formed which can be removed overhead from a fractionating column leaving the other product, 1,3-butanediol, behind. It has also been reported that if higher temperatures are used the diolefin may be produced by dehydration of the glycol. Thus, it has been reported that isoprene was obtained by the methanolysis of 4,4-dimethyl-meta-dioxane together with large amounts of 3-methyl-butanediol-1,3 and 3-methyl-3-methoxybutanol-1 so that the yield of isoprene was apparently rather low, i.e. less than 50 percent. It is with this last described reaction that the instant invention is concerned.

A method now has been found for the continuous production of isoprene in yields of the order of 90 percent by the methanolysis of 4,4-dimethyl-meta-dioxane.

It is an object of this invention to provide a method for the production of isoprene in high yields.

It is a further object of this invention to provide a method for the production of isoprene in high yields by the methanolysis of 4,4-dimethyl-meta-dioxane.

It is a further object of this invention to provide a method for the continuous production of isoprene in high yields by the methanolysis of 4,4-dimethyl-meta-dioxane.

Other objects of the invention will be apparent from the following description and the claims.

In accordance with the instant invention, a mixture of methanol and 4,4-dimethyl-meta-dioxane is heated in the presence of a strong acid synthetic type cation exchange resin in the hydrogen cycle. The reaction mixture is heated to a temperature sufficient to distill overhead through a fractionating column, an azeotrope of methanol and methylal, the methylal being formed in the reaction.

The composition of the theoretical binary azeotrope of methanol and methylal is 8.2 weight percent methanol, 91.8 weight percent methylal. This azeotrope has a boiling point of 41.9° C. In addition to the methanol-methylal azeotrope, the isoprene which is formed in the reaction will be likewise distilled overhead since it has a boiling point of 34° C. Moreover, minor amounts of other by-products formed will likewise be distilled. In order to be certain that the azeotrope is distilled, the reaction mixture is heated sufficiently to provide an overhead temperature slightly in excess of the boiling point of the methanol-methylal azeotrope, in general, an overhead temperature of about 43° C. has given excellent results. The temperature of the reaction mixture necessary to provide this overhead temperature will approach that of methanol, i.e. about 65° C., however, the controlling temperature is that of the overhead. Overhead temperatures in excess of about 43° C. are to be avoided since these merely result in the distillation from the reaction of larger amounts of methanol which are thereby prevented from reacting with the 4,4-dimethyl-meta-dioxane. When an overhead temperature of about 43° C. is used, it has been found that the composition of a typical distillate is 24.4 weight percent isoprene, 60.2 weight percent methylal, 9.4 weight percent methanol, and 6.0 weight percent other by-products. Thus, it will be seen that there is a slight excess of methanol over that necessary to form the azeotrope. With closer fractionation and temperature control, the composition of the distillate can likewise be more closely controlled. The isoprene is recovered by conventional efficient fractionation methods.

The rate at which the products are being distilled is determined and a mixture of methanol and 4,4-dimethyl-meta-dioxane is supplied to the reaction mixture continuously at a rate sufficient to maintain the desired concentration of cation exchange resin in the reaction mixture. The mole ratio of methanol to 4,4-dimethyl-meta-dioxane of the mixture added to the reactor should be adjusted so that the desired mole ratio of methanol to 4,4-dimethyl-meta-dioxane also is maintained in the reaction mixture.

It has been found that the mole ratio of the methanol to 4,4-dimethyl-meta-dioxane should range from 2:1 to 10:1 and preferably from 4:1 to 6:1, in order to obtain the optimum yields of isoprene. Thus, the mole ratio of the methanol and 4,4-dimethyl-meta-dioxane mixture added to the reactor should likewise have a mole ratio within the same range. However, it is preferred that a slight excess of methanol be employed since a portion of the methanol is utilized to form the methanol-methylal azeotrope and cannot take part in the reaction. About a 10 mole percent excess of methanol is preferred. Thus, if it is desired to maintain a mole ratio of methanol to 4,4-dimethyl-meta-dioxane in the reactor of 2:1, the mixture added to the reactor should contain at least 2.2 moles of methanol per mole of 4,4-dimethyl-meta-dioxane.

Although sulfuric acid is a known catalyst for the methanolysis reaction, its use is not preferred since at the higher concentrations required for optimum isoprene production, sulfuric acid may char the reactants and, in addition, it frequently causes bumping and other evidences of local overheating during the reaction.

It has been found in accordance with the instant invention that a strong acid type cation exchange resin in the hydrogen cycle is a highly preferred catalyst. Such a solid catalyst does not cause charring of the reactants, it is convenient to handle and to maintain in constant concentration, and can be conveniently recovered and reused.

It has been found that optimum yields of isoprene are obtained when the cation exchange resin has a concentration ranging from 25 weight percent to 50 weight percent based on the total weight of methanol, 4,4-dimethyl-meta-dioxane and resin in the reactor. Although high concentrations may be used, they are less desirable since the volume of reactants is reduced to the point where the total throughput is rather low. Concentrations below 25 weight percent have been found to be undesirable since the yield of isoprene is markedly reduced at the lower concentrations. Excellent results have been obtained when the cation exchange resin concentration has ranged between 37 weight percent and 43 weight percent based on the total weight of the methanol, meta-dioxane, and resin.

The cation exchange resins which may be utilized as the catalyst in the method of the instant invention are the commercially available strong acid synthetic type cation exchange resins such as Amberlite IR-120 or Permutit Q which are produced by the sulfonation of the copolymer prepared from a mixture of styrene and divinyl benzene. Amberlite IR-120 and Permutit Q are well-known to the art of ion exchange and their preparation is described both in the patented art and in the technical literature, in particular, the detailed method of their preparation is set forth starting with the first full paragraph on page 84 of the book by Robert Kunin, entitled "Ion Exchange Resins," second edition, John Wiley and Sons, Inc., New York (1958). If for any reason the acidic properties of the ion exchange resin appear to become spent, the resin may be readily removed from the reactor and regenerated with a strong acid in accordance with well-known conventional techniques. Since the resin is usually wet with water after conversion to the hydrogen cycle, it is air dried to constant weight prior to use in order to obtain the desired concentration of resin in the reaction mixture.

The following examples are provided in order to demonstrate the utility of the instant invention and to illustrate certain specific embodiments thereof.

Example I

A mixture consisting of 0.5 mole (58 grams) of 4,4-dimethyl-meta-dioxane, 2.5 moles (80 grams) of methanol and 64.9 grams (32 weight percent) of Amberlite IR-120 cation exchange resin in the hydrogen cycle was charged to a distilling flask fitted with a fractionating column and head so that total reflux could be utilized if desired.

The mixture was heated so that the overhead temperature was approximately 43° C. at which temperature the methanol-methylal azeotrope distilled together with the isoprene formed. The heating was continued until no forward flow could be observed at this temperature, i.e. for 203 minutes, and thereafter the heating was continued under total reflux for another 120 minutes. No additional reactants were added at this time to the reaction. The products were collected in suitable traps. The amount of isoprene obtained was 41.2 mole percent, i.e. a 41.2 percent yield, per mole of 4,4-dimethyl-meta-dioxane.

Example II

A mixture consisting of 0.5 mole (58 grams) of 4,4-dimethyl-meta-dioxane, 2.5 moles (80 grams) of methanol and 88.2 grams (39 weight percent) Amberlite IR-120 cation exchange resin in the hydrogen cycle was charged to the same apparatus employed in Example I except that the distillation flask was also fitted with a dropping funnel. The methanol-methylal azeotrope which was formed was distilled from the reaction maintaining a temperature of about 43° C. overhead. As the azeotrope distilled a mixture of 2.2 moles of methanol and 1.0 mole of 4,4-dimethyl-meta-dioxane was added at the same rate as the distillate was collected. The reaction was continued after all of the make-up mixture had been added until the azeotrope had substantially stopped distilling.

A total of 13 cuts were collected, each cut being 20 milliliters except the final which was somewhat less, and each cut was analyzed. The isoprene production was practically constant in cuts 5 through 12, but dropped off rapidly in cut 13 since the addition of make-up was discontinued between cuts 11 and 12. The isoprene yield was 87.2 percent based on the total quantity of 4,4-dimethyl-meta-dioxane charged. A duplicate run with slightly better control of reaction conditions gave an isoprene yield of 89.0 percent.

These experiments demonstrate that by employing the process of the instant invention it is possible to obtain exceedingly high yields of isoprene by the methanolysis of 4,4-dimethyl-meta-dioxane.

I claim:

1. A method for the production of isoprene which comprises heating a mixture of methanol and 4,4-dimethyl-meta-dioxane in the presence of a cation exchange resin in the hydrogen cycle to produce isoprene and methylal, the mole ratio of the methanol to the said meta-dioxane ranging from 2:1 to 10:1 and the amount of said resin ranging from 25 weight percent to 50 weight percent based on the total weight of the said methanol, meta-dioxane and resin, maintaining the reaction at a temperature sufficient to remove by distillation a methanol-methylal azeotrope and isoprene from the reaction mixture, recovering the azeotrope and isoprene, and continuously adding to the reaction mixture methanol and 4,4-dimethyl-meta-dioxane at a rate sufficient to substantially maintain the desired mole ratio of methanol to meta-dioxane and the concentration of resin in the reaction mixture.

2. A method for the production of isoprene which comprises heating a mixture of methanol and 4,4-dimethyl-meta-dioxane in the presence of a cation exchange resin in the hydrogen cycle to produce isoprene and methylal, the mole ratio of the methanol to the said meta-dioxane ranging from 2:1 to 10:1 and the amount of said resin ranging from 25 weight percent to 50 weight percent based on the total weight of the said methanol, meta-dioxane and resin, maintaining the reaction at a temperature sufficient to provide an overhead temperature of about 43° C. to remove by distillation a methanol-methylal azeotrope and isoprene from the reaction mixture, recovering the azeotrope and isoprene, and continuously adding to the reaction mixture methanol and 4,4-dimethyl-meta-dioxane at a rate sufficient to substantially maintain the desired mole ratio of methanol to meta-dioxane and the concentration of resin in the reaction mixture.

3. A method for the production of isoprene which comprises heating a mixture of methanol and 4,4-dimethyl-meta-dioxane in the presence of a cation exchange resin in the hydrogen cycle to produce isoprene and methylal, the mole ratio of the methanol to the said meta-dioxane ranging from 4:1 to 6:1 and the amount of said resin ranging from 37 weight percent to 43 weight percent based on the total weight of the said methanol, meta-dioxane and resin, maintaining the reaction at a temperature sufficient to remove by distillation a methanol-methylal azeotrope and isoprene from the reaction mixture, recovering the azeotrope and isoprene, and continuously adding to the reaction mixture methanol and 4,4-dimethyl-meta-dioxane at a rate sufficient to substantially maintain the desired mole ratio of methanol to meta-dioxane and the concentration of resin in the reaction mixture.

4. A method for the production of isoprene which comprises heating a mixture of methanol and 4,4-dimethyl-meta-dioxane in the presence of a cation exchange resin in the hydrogen cycle to produce isoprene and methylal, the mole ratio of the methanol to the said meta-dioxane ranging from 4:1 to 6:1 and the amount of said resin ranging from 37 weight percent to 43 weight percent based on the total weight of the said methanol, meta-dioxane and resin, maintaining the reaction at a temperature sufficient to provide an overhead temperature of about 43° C. to remove by distillation a methanol-methylal azeotrope and isoprene from the reaction mixture, recovering the azetotrope and isoprene, and continuously adding to the reaction mixture methanol and 4,4-dimethyl-meta-dioxane at a rate sufficient to substantially maintain the desired mole ratio of methanol to meta-dioxane and the concentration of resin in the reaction mixture.

References Cited in the file of this patent
UNITED STATES PATENTS 2,337,059     Mikeska et al. _____ Dec. 21, 1943

OTHER REFERENCES

Sussman: "Catalysis by Acid-Regenerated Cation Exchangers," Ind. and Eng. Chemistry, vol. 38, No. 12, pages 1228–1230, December 1946.